US008958327B2

(12) United States Patent
Watve et al.

(10) Patent No.: US 8,958,327 B2
(45) Date of Patent: Feb. 17, 2015

(54) PASSIVE NETWORK LATENCY MONITORING

(75) Inventors: Rohit Watve, Santa Clara, CA (US); Chandan Mishra, Sunnyvale, CA (US); Sanjay Sane, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 162 days.

(21) Appl. No.: 13/571,706

(22) Filed: Aug. 10, 2012

(65) Prior Publication Data
US 2014/0043987 A1     Feb. 13, 2014

(51) Int. Cl.
H04L 12/26     (2006.01)

(52) U.S. Cl.
USPC ............................................ 370/252; 370/248

(58) Field of Classification Search
USPC .................................................. 370/248, 252
See application file for complete search history.

(56) References Cited

U.S. PATENT DOCUMENTS

| 8,064,485 B1* | 11/2011 | Montini et al. ............ 370/503 |
| 8,437,259 B1* | 5/2013 | Nucci et al. ............. 370/238 |
| 2003/0005145 A1* | 1/2003 | Bullard ..................... 709/238 |
| 2008/0008178 A1* | 1/2008 | Tychon et al. ............. 370/392 |
| 2010/0309932 A1* | 12/2010 | Diab et al. ................ 370/503 |
| 2012/0320933 A1* | 12/2012 | Magee ....................... 370/503 |
| 2013/0028265 A1* | 1/2013 | Ronchetti et al. ........... 370/400 |
| 2013/0086250 A1* | 4/2013 | Eskicioglu et al. .......... 709/224 |
| 2014/0029449 A1* | 1/2014 | Xu et al. .................... 370/252 |

OTHER PUBLICATIONS

Wikipedia page on Dijkstra's Algorithm (http://en.wikipedia.org/wiki/Dijkstra's_algorithm), Jun. 17, 2014.
Wikipedia page on IS-IS (http://en.wikipedia.org/wiki/IS-IS), Jun. 16, 2014.
McKeown paper (McKewon et al., *Achieving 100% Throughput in an Input Queued Switch*, IEEE Transactions on Communications, vol. 47, No. 8, Aug. 1999. Published Aug. 1999 http://ieeexplore.ieee.org/xpl/login.jsp?tp=&arnumber=780463&url=http%3A%2F%2Fieeexplore.ieee.org%2Fxpls%Fabs_all.jsp%3Farnumber%3D780463).
Dijkstra paper (E.W. Dijkstra, "A Note on Two Problems in Connexion with Graphs," Numerische Mathematik 1, 269-271 (1959)).

* cited by examiner

*Primary Examiner* — Jason Mattis
(74) *Attorney, Agent, or Firm* — Haynes and Boone, LLP (57) ABSTRACT

A method measures a resident delay for each port in a node in a network and a peer delay between each pair of neighbor nodes in the network. From these resident delays and peer delays, latency between each pair of neighbor nodes in the network is determined. The method includes weighting a route for a data packet going through the nodes in the network using the determined latencies. Each node includes a switch having switchable connections and is configured by a controller to send probe packets from an output port to a port in a neighbor node. The packet may include a time stamp and an identifier.

20 Claims, 8 Drawing Sheets

PASSIVE NETWORK LATENCY MONITORING

TECHNICAL FIELD

The present disclosure relates generally to network measurements. More particularly, embodiments described herein relate to passive network latency measurements.

BACKGROUND

A measure of network latency is desirable for internet service providers to comply with service level agreements (SLA) with a client, and to market their products. In network latency measurements, active strategies are typically used. In an active latency measurement, a number of probe packets are sent across multiple paths between nodes A and B in a network, such as Level 2, Multi-Path (L2MP) network. The time it takes for each packet to traverse from node A to node B is measured. A statistical analysis of the data obtained is used to establish a diagnostic of the network latency. However, the number of equal cost multi-paths (ECMPs) between two given nodes A and B in the network grows exponentially with the number of nodes in the network. Thus, in active network latency measurements the number of probe packets that are required to be sent between nodes A and B grows exponentially with the size of the network. Such exponential growth creates a heavy burden for active latency measurement processes. Also, using an exponentially growing number of probe packets burdens network hardware, since other tasks may need to be processed simultaneously with the latency measurement.

BRIEF DESCRIPTION OF THE DRAWINGS

In the figures, elements having the same reference number perform the same or similar functions.

DESCRIPTION OF EXAMPLE EMBODIMENTS

Overview

In this detailed description, the term "node" may refer to, for example, a switch device that relays data packets in a data communication network. Such a switch device may include multiple ports for receiving data packets into the switch device ("ingress") and for transmitting data packets out of the switch device ("egress"), a processor, and a memory accessible by the processor. Within the switch device, switchable connections are provided such that a data packet received in an ingress port may be sent out from any one of multiple egress ports.

According to embodiments disclosed herein, a method includes measuring an approximate resident delay for a port at a node in a network; measuring peer delays between a pair of nodes in the network; and calculating network latencies for data packets sent between nodes in the network based on the resident delays and the peer delays.

According to embodiments disclosed herein, the memory stores data related to a resident delay time for each port in the switch; and data related to peer delays, each of which is a transit time for a packet to travel from a designated egress port of the switch device to an ingress port of a neighbor node.

According to embodiments disclosed herein a switch may be configured by a controller to send a probe packet from an output port of the switch to a second switch at a neighbor node. The probe packet may include a time stamp and an identifier.

According to embodiments disclosed herein a node may include means for receiving a data packet from a first neighbor node in a network; means for sending a data packet to a second neighbor node in the network; means for calculating a resident time for the data packet in the node; means for determining a peer delay for the data packet to travel to the second neighbor node; and means for storing the resident time for each port in the node, and for storing the peer delay for each neighbor node.

Active strategies for network latency measurements are sometimes selected because they provide an accurate current state of a network. Active latency measurements may be a reliable and cost-effective way to obtain information about network performance, especially when the number of nodes is somewhat limited or is changing only at a moderate rate.

In some embodiments consistent with the present disclosure, a network may be changing rapidly. In such a network, active latency measurements may become problematic as to network usage and device load. For such networks, a passive network latency measurement strategy as disclosed herein may be desirable in fast changing networks. Passive latency measurements as described herein may reduce considerably the number of probe packets that are required to be sent between nodes in the network. Thus, passive strategies consistent with embodiments herein reduce overhead and thus enable a higher network utilization. At the same time, passive latency measurements as disclosed herein facilitate establishing SLAs in complex networks.

A method as disclosed herein may include determining a resident delay for each port at each node in a network; determining a peer delay between each pair of connected ports between neighbor nodes in the network; determining a latency between each pair of ports in neighbor nodes in the network; and creating a graph in which every pair of ports in neighbor nodes of the network is represented by an edge that is assigned a weight proportional to the latency determined for that pair of ports of the neighbor nodes.

In further embodiments disclosed herein the memory of a switch device may store data related to the resident delay for each port and a peer delay to each neighbor node measured by a packet that is sent to the neighbor nodes.

Example Embodiments

Figure 1:
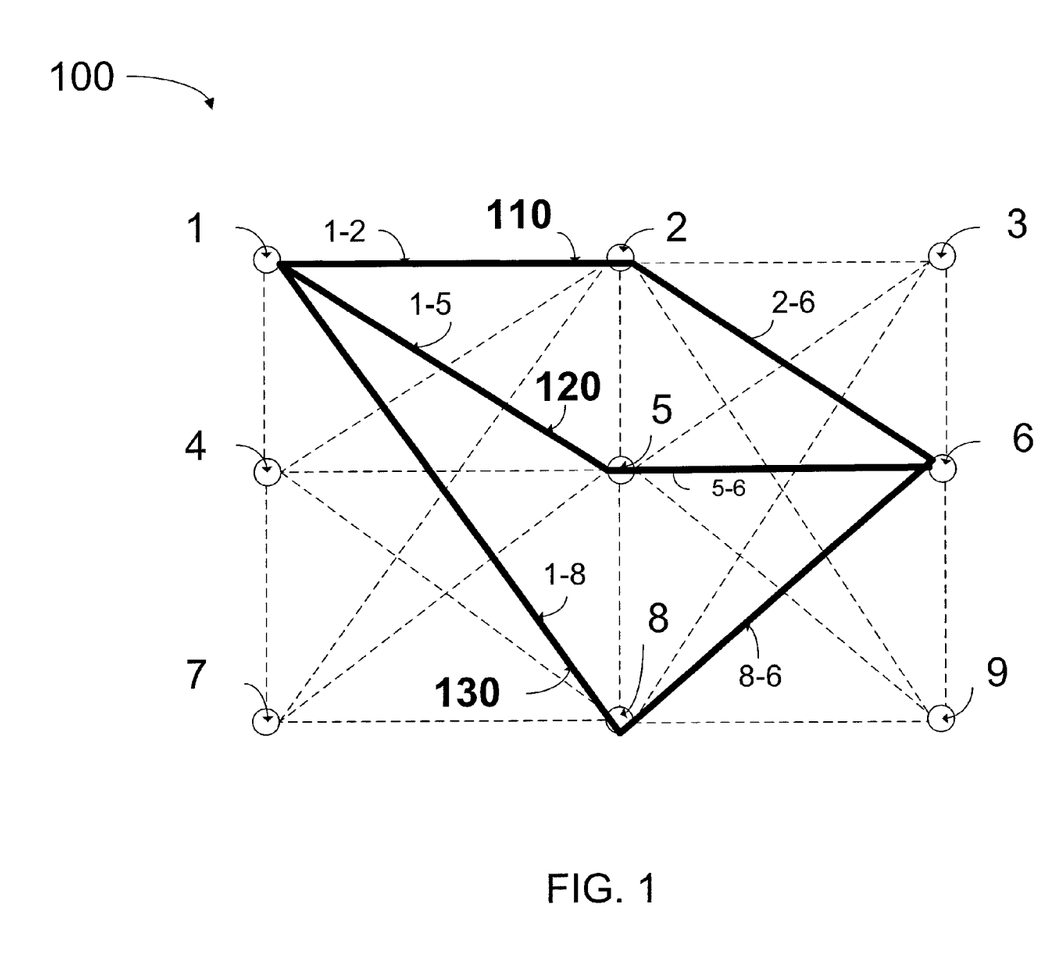
FIG. 1 illustrates a graphical view of a network having connectivity between two nodes along network paths, according to some embodiments.

FIG. 1 illustrates a graphical view of network 100 having connectivity between node 1 and node 6 along network paths 110, 120, and 130, according to some embodiments. Network 100 in FIG. 1 includes nodes 1, 2, 3, 4, 5, 6, 7, 8, and 9. Each node in network 100 may include network components such as switches, routers, and other devices. According to FIG. 1, a communication link existing between a node i and a neighbor node j is labeled link i-j, where i=1-9, j=1-9, and j≠i. Embodiments consistent with the present disclosure may include a connectivity matrix representation of network 100. Further according to embodiments disclosed herein, a probe packet traveling from node i to node j may have associated a peer delay t(i-j), which is the delay for a probe packet to traverse link i-j, measured from the corresponding output or egress port of node i to the corresponding input or ingress port of node j.

FIG. 1 shows three possible routes 110, 120, and 130, between nodes 1 and 6, in network 100. Route 110 includes link 1-2, and link 2-6. A probe packet following route 110 will incur a peer delay time t(1-2) and a peer delay time t(2-6). Route 120 includes link 1-5 and link 5-6. A probe packet following route 120 will incur a peer delay time t(1-5) and a peer delay time t(5-6). Route 130 includes link 1-8 and link 8-6. A probe packet following route 130 will incur a peer delay time t(1-8) and a peer delay time t(8-6).

Accordingly, the time it takes for a probe packet to transit from node 1 to node 6 depends on the route taken by the packet. In embodiments consistent with the present disclosure, a node i in network 100 may store peer delays t(i-j) for each neighbor node j. For example, node T can represent a switch device with a memory circuit which stores peer delays t(i-j) for each neighbor node j.

Figure 2:
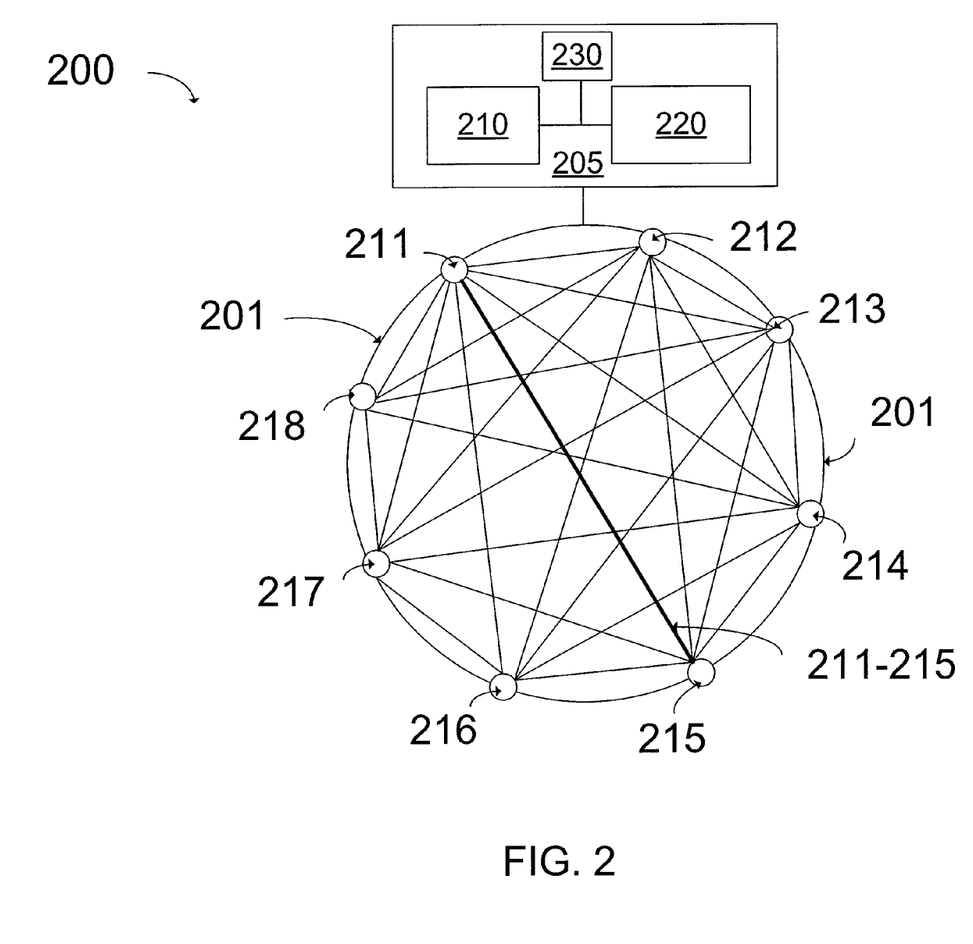
FIG. 2 illustrates a partial view of node 200 in a network, according to some embodiments.

FIG. 2 illustrates a partial view of node 200 in a network, according to some embodiments. As shown in FIG. 2, node 200 includes switch 201 and controller 205, according to some embodiments. Controller 205 may include, for example, processor circuit 210, memory circuit 220, and clock circuit 230. Clock circuit 230 may provide clock signals to control timing in node 200. Switch 201 in node 200 may include ports 211 through 218. The number of ports in switch 201 is not limiting, and ports 211-218 shown herein are illustrative only. According to embodiments of the present disclosure, some of the ports in node 200 may be input (ingress) ports and some of the ports may be output (egress) ports. Further according to embodiments disclosed herein, ports 211-218 in node 200 may be internally coupled to each other, such that each port is coupled to every one of the other ports. For example, port 211 is connected to every one of ports 212-218. The connections between two ports in switch 201 may be controlled under controller 205 by one or more switches for dynamic reconfiguration. Thus, in one configuration port, 211 may be connected to port 213, and in a different configuration port 211 may be connected to port 215.

FIG. 2 also shows processor circuit 210 and memory circuit 220, associated with controller 205 in node 200. A resident delay R(p1, p2) exists between any two ports p1 and p2 in switch 201. R(p1, p2) represents the delay for a packet traversing from port p1 to port p2. For example, resident delay R(211, 215) exists between port 211 and port 215. R(211, 215) is the time it takes for a data packet to traverse internally from port 211 to port 215 in switch 201. For port 215 in switch 201, a set of resident delays S(215) can be defined as:

$$S(215)=\{R(211,215),R(212,215),R(213,215),R(214,215),R(216,215),R(217,215),R(218,215)\}.$$

More generally, for a port pk in a network switch, the set of resident delays S(pk) can be defined as:

$$S(pk)=\{R(x1,pk),R(x2,pk),\ldots R(xN,pk)\}.$$

Where {x1, x2, ... xN} is the set of all ports in the network switch other than pk. Given the definition of set S(pk) of resident delays above, an approximate resident delay D(pk) may be defined for some embodiments, for example, as:

$$D(pk)=\mathrm{Avg}(S(pk)).$$

That is, approximate resident delay D(pk) is the average of all of the resident delays in the set S(pk). In some embodiments, for any port pk in a given switch, approximate resident delay D(pk) will have a small standard deviation. In some embodiments, approximate resident delay D(pk), may be defined as a measured value based on measuring network latency for traffic egress from port pk. That measured approximate resident delay D(pk) may be a function of several measured values, without regard to the specific ingress ports from which the measurement are initiated.

According to some embodiments consistent with the present disclosure, software stored in memory circuit 220 inserts probe packets at different ports destined for port pk, at different times (e.g., regular time intervals) to measure the delay of each of the probe packets from ingress to egress to update set S(pk), and thus the value of approximate resident delay D(pk).

The above definitions of approximate resident delay D(pk) associated with traffic 'leaving' switch 201 through port pk are merely illustrative and are not limiting. Alternatively, embodiments consistent with the present disclosure may provide an approximate resident delay D(pk') associated with traffic 'entering' switch 201 through port pk'. In this case, the approximate resident delay may be calculated from a set S(pk') including resident delays R(pk', pk) between input (ingress) port pk' and any one of multiple other output (egress) ports pk in switch 201.

Figure 3:
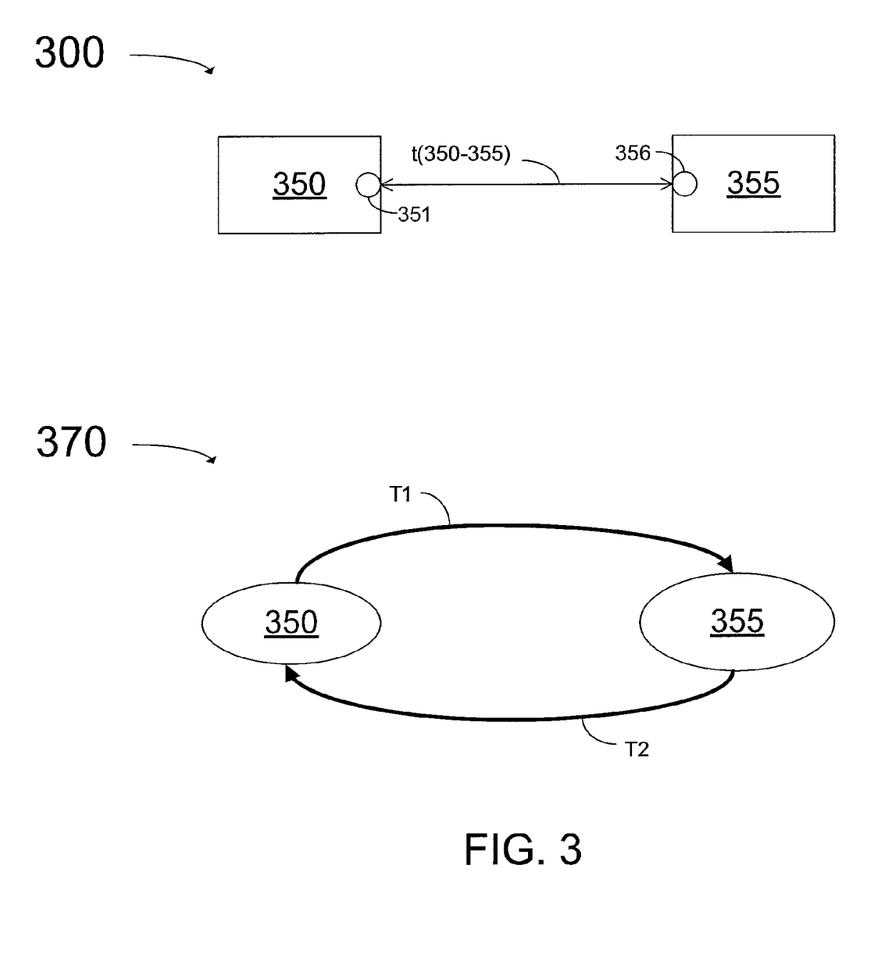
FIG. 3 illustrates a partial view of a model of the communication links between two nodes 350 and 355 in a network, according to some embodiments.

FIG. 3 illustrates a network including one or more communication links (e.g., communication link 300) between neighbor nodes 350 and 355. Communication link 300 may include peer delay t(350-355) between port 351 of node 350 and port 356 of node 355. In general, the delay between a pair of ports of nodes 350 and 355 may depend on the direction of packet traversal. For example, a packet traversing through node 350 to node 355 incurs the an actual resident delay in node 350 at egress port 351 and peer delay time t(350-355). Conversely, a packet traversing through node 355 to node 350 incurs an actual resident delay in node 355 at egress port 356, and peer delay time t(355-350).

Large amounts of network resources (e.g., bandwidth, processor cycles, memory, etc.) would be expended in measuring and recording actual resident delays between all ingress and egress ports in a network in real time or near real time. In some embodiments, a measurement of network latency substitutes an approximate resident delay for the actual resident delay. For example, D(351) (as defined above) can be substituted for the actual resident delay associated with traversing through node 350 (from any ingress port) out through egress port 351. D(356) (as defined above) can be substituted for the actual resident delay associated with traversing through node 355 (from any ingress port) out through egress port 356. In some embodiments, approximate resident delay D(351) in node 350 may be different from approximate resident delay D(356) in node 355. The directionality of communication link 300 may be expressly represented, for example, by weighted graph 370. Weighted graph 370 illustrates time T1 that represents the latency for a packet transiting from node 350 to node 355, and time T2 that represents the latency for packet transiting from node 355 to node 350. T1 and T2 may be defined as follows:

$$T1 = t(355-350) + D(351) \quad (2.1)$$

$$T2 = t(355-350) + D(356) \quad (2.2)$$

Where D(351) is the approximate resident delay for port 351 in node 350, and D(356) is the approximate resident delay for port 356 in node 355.

According to some embodiments, software in a controller included in node 350 may send probe packets from egress port 351 to an ingress port in node 355 to measure peer delay t(355-350). Peer delay t(350-355) may be measured at node 350 by sending a probe packet to node 355. In response, node 355 returns measured peer delay t(350-355) to node 350. In some embodiments, software in node 350 may inject packets from one of its own ingress ports designating one or more of its own egress ports to measure resident delays at these egress ports. Node 355 may send to node 350, as part of the probe packet, approximate resident delay D(356). The controller in node 350 may find the latencies T1 and T2 using Eqs. (2.1) and (2.2) based on clock 230. According to some embodiments, peer delays are measured using IEEE 1588 'peer-to-peer' transparent clocking. The peer delay is obtained at node 350 by comparing the time stamp included by node 355 in the probe packet at the time of sending to a clock value in a clock circuit included in node 355. Thus, in this manner software stored in memory circuit 220 may also update values of peer delay times between node 350 and other nodes. The probe packets sent from node 350 may be processed through any of the ports in the switch fabric included in node 350. As described herein, node 350 may be implemented by node 200 of FIG. 2, which includes switch 201 with ports 211 through 218. That is, ports 351, and 356 may each be implemented by any of ports 211-218, described in detail above in relation to FIG. 2.

Figure 4:
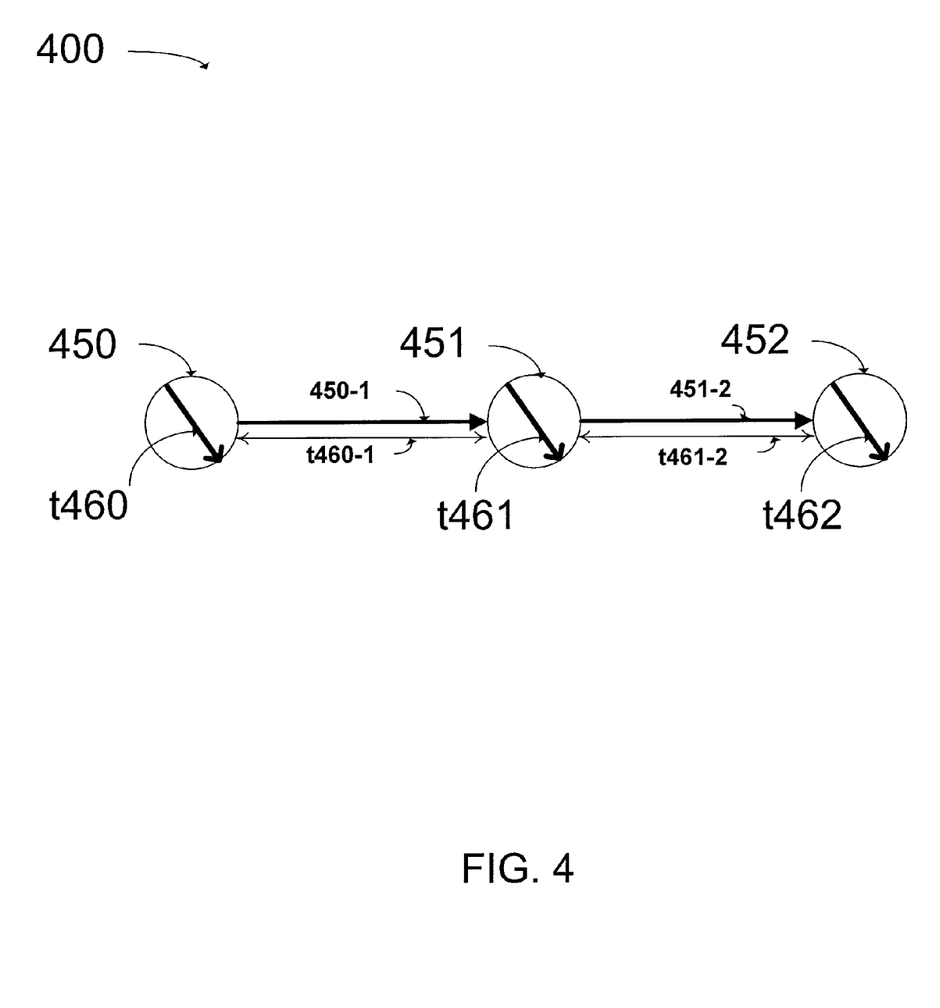
FIG. 4 illustrates a partial view of a model of communication links between nodes 450, 451 and 452 in a network, according to some embodiments.

FIG. 4 illustrates a partial view of communication links 450-1 and 451-2 among node 450, node 451, and node 452 in a network portion 400, according to some embodiments. Also illustrated in FIG. 4 are a peer delay t460-1, peer delay t461-2, resident delay t460, resident delay t461, and resident delay t462. According to embodiments consistent with the present disclosure, resident delay 460 is associated with an output port in node 450 that is linked to node 451. Likewise, resident delay 461 may be associated with an output port in node 451 that is linked to node 452, and resident delay 462 may be associated with an output port in node 452. Thus, a delay measurement T4 for a packet traversing from an egress port in node 450 to an ingress port in node 452 in network portion 400 includes peer delays t460-1 and t461-2, and resident delay 461, as follows:

$$T4 = t460-1 + t461-2 + t461 \quad (3.1)$$

In some embodiments consistent with the present disclosure, network portion 400 may have node 450 as a source node linked to a first host through an ingress port and node 452 may be a destination node linked to a second host through an egress port. In this case, host to host latency T4' includes, in addition to peer delays t460-1 and t461-2, resident delays 460, 461, and 462, as follows:

$$T4' = t460-1 + t461-2 + t460 + t461 + t462 \quad (3.2)$$

According to some embodiments, resident delays t460, t461, and t462 may be approximated using the averaging procedure described above in relation to FIG. 2. In some embodiments, resident delays t460, t461, and t462, and transit delays t460-1 and t461-2 are maintained as a history of average values for switch ports. These historical link and residence latency values along with historical topology information can be used to figure network-wide latency between ingress point A (e.g., node 1, cf. FIG. 1) and egress point B (e.g., node 6, cf. FIG. 1).

Figure 5:
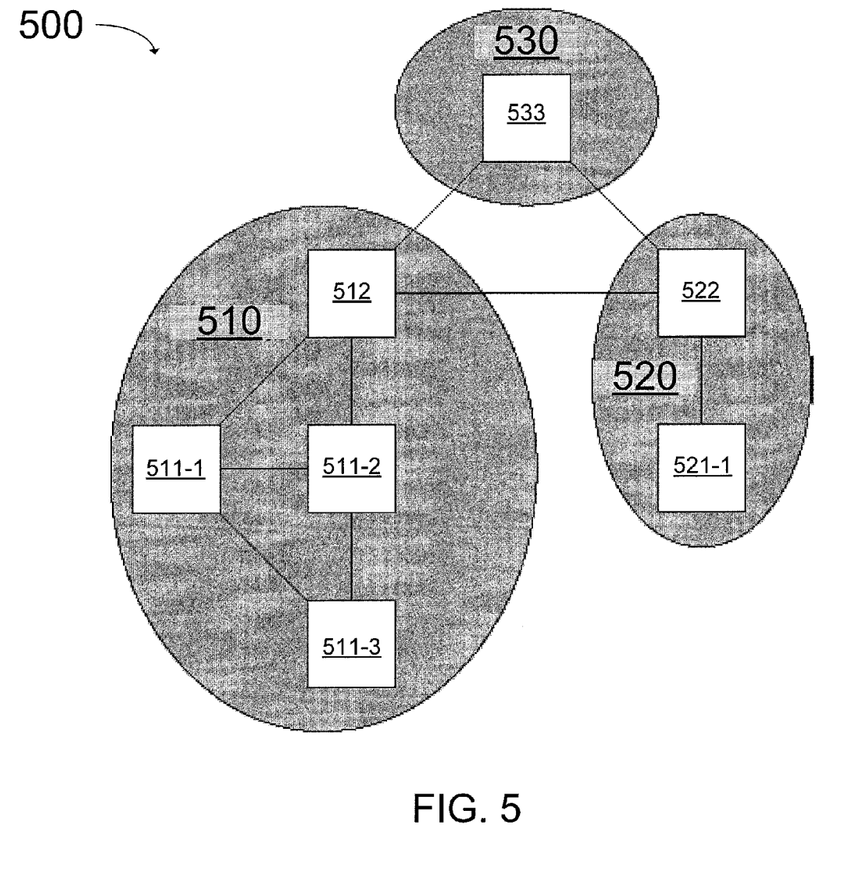
FIG. 5 illustrates a partial view of a model of network 500, according to some embodiments.

FIG. 5 illustrates a partial view of a network 500 according to some embodiments. Network 500 may have the architecture shown in FIG. 5, including sub-networks 510, 520, and 530. In some embodiments, network 500 may be an Intermediate System to Intermediate System (ISIS) network, consistent with the present disclosure. In such a network, each sub-network may include level 1 nodes, which are nodes essentially interconnected within each sub-network. ISIS networks may also include level 2 nodes, which are connected with level 2 nodes from other sub-networks. Further embodiments of an ISIS network may include hybrid nodes, combining level 1 and level 2 capabilities. For example, sub-network 510 in FIG. 5 may include a plurality of level 1 nodes such as nodes 511-1, 511-2, and 511-3. Also, sub-network 510 may include a hybrid node 512, which connects to level 1 nodes 511-1 and 511-2, with hybrid node 522 from sub-network 520, and with level 2 node 533 in sub-network 530. Node 533 in sub-network 530 may be a level 2 node because it only connects to hybrid nodes 512 and 522. Node 521-1 in sub-network 520 is a level 1 node.

According to embodiments disclosed herein, passive latency measurements may be calculated separately for each of the sub-networks 510, 520, and 530, and then propagated through the entire network. For example, each sub-network 510, 520, and 530 may be modeled as a single node and used in a passive latency measurement configuration consistent with the present disclosure. Thus, the modeling is essentially self-replicating, such that complex architectures may be resolved in an iterative manner, using the basic latency measurement disclosed herein.

Figure 6:
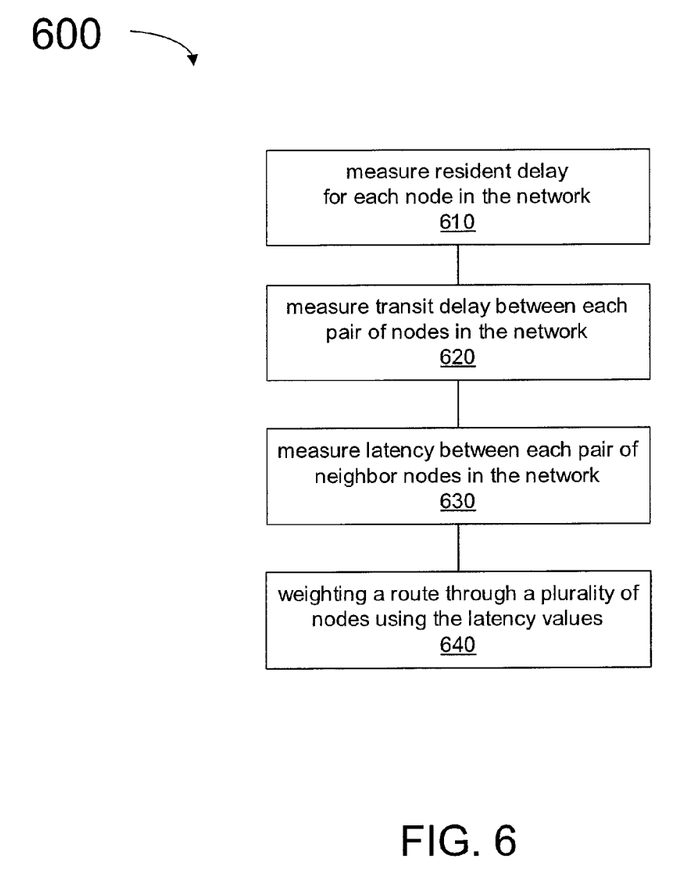
FIG. 6 shows flowchart 600 for a method for measuring latency in a network, according to some embodiments.

FIG. 6 shows a flowchart for a method 600 for measuring latency in a network, according to some embodiments, such as using processes described herein. At step 610, each node in the network measures its resident delays and creates a per port average. Thus, some embodiments avoid keeping track of every ingress-egress port combination inside the node. At step 620, the peer delay between each pair of nodes in the network is measured. At step 630, the latency between each pair of neighbor nodes in the network is measured. For example, at step 630, the resident delay measured in step 610 and the peer delay measured in step 620 may be added for each pair of nodes in the network. At step 640, each route through a number of nodes may be weighted using the latency values measured in step 630. According to some embodiments, method 600 enables a network graph to be created with links joining neighbor nodes. In such a graph, each link is provided a weight proportional to the latency between the neighbor nodes. A graph as such may be useful in determining the shortest data transit routes for a data packet traversing from a source node to a destination node in the network.

Figure 7A:
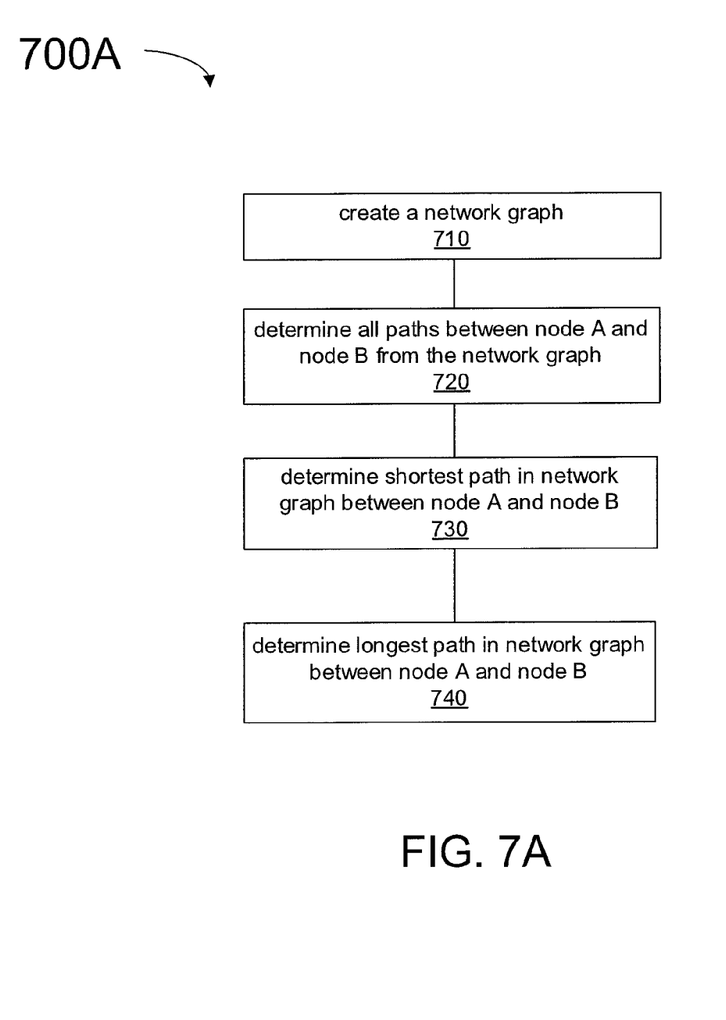
FIG. 7A shows flowchart 700A for a method for measuring a latency in a network, according to some embodiments.

FIG. 7A shows a flowchart for a method 700A for determining latency in a network, according to some embodiments. At step 710, a network graph is created. In some embodiments, step 710 may be performed following steps 610-640 of method 600 described in detail above in conjunction with FIG. 6. Thus, the links joining neighbor nodes in the network graph created in step 710 may have a weight proportional to the latency between the neighbor nodes. At step 720, all possible paths between node A and node B are identified from the network graph created in step 710. For example, paths 110, 120, and 130 may be identified in step 720 for node 1 and node 6 (cf. FIG. 1). The selections of ingress point A (e.g., node 1, cf. FIG. 1) and egress point B (e.g., node 6, in FIG. 1) may be arbitrary or may depend on the particular interest of the user executing method 700A. For example, in some embodiments the user executing method 700A may be a network provider establishing an SLA between a server in node A, and a server in node B.

At step 730, the shortest path, Lab_min, is selected from the set of all paths between nodes A and B which are identified in step 720. According to some embodiments, step 730 may be performed using Dijkstra's algorithm, for example. A summary of Dijkstra's algorithm is disclosed in the paper by E.W. Dijkstra, "A Note on Two Problems in Connexion with Graphs," Numerische Mathematik 1, 269-271 (1959). At step 740, the longest path Lab_max is selected from the set of all paths between nodes A and B found in step 720. Thus, the values Lab_min and Lab_max provide a measure of the minimum and maximum latency values expected between nodes A and B in the network. Note that according to embodiments consistent with the present disclosure, the values Lab_min and Lab_max may be varying in time, depending on specific network conditions. Furthermore, more sophisticated information may be retrieved after a set of all possible paths between nodes A and B is found in step 720. For example, an average latency value may be determined, with a standard deviation.

Figure 7B:
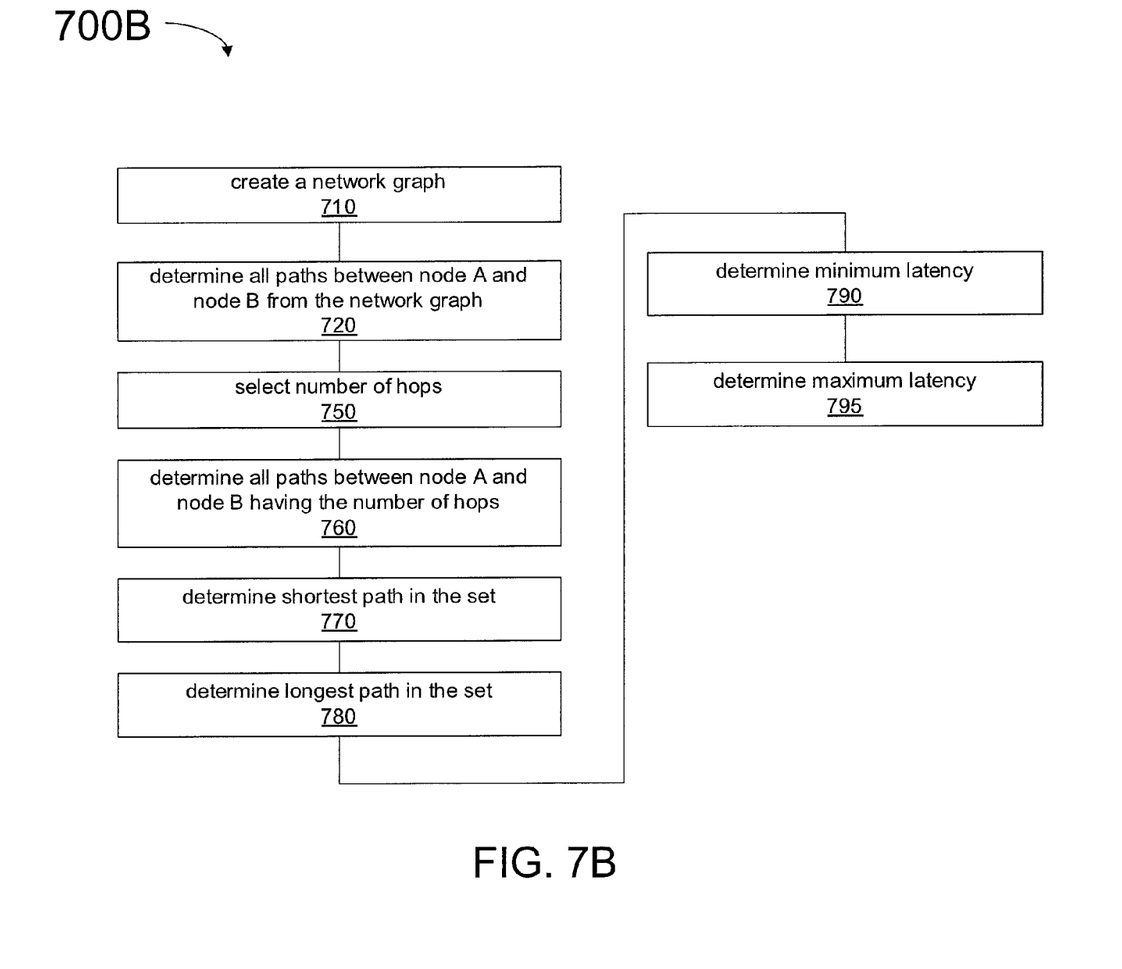
FIG. 7B shows flowchart 700B for a method for measuring latency in a network, according to some embodiments.

FIG. 7B shows a flowchart for a method 700B for determining latency in a network, according to some embodiments. In method 700B, steps 710 and 720 may be implemented in the same manner as correspondingly numbered steps of method 700A described in conjunction with FIG. 7A above. At step 750, method 700B selects a value representing a selected number of hops. A hop is that segment of a path taken by a packet between one node and a neighbor node. According to some embodiments, a network performance parameter, such as cost, may be associated with each hop. For example, such a parameter may be the susceptibility to errors for a packet traversing between two nodes. In some embodiments, step 750 is used in the L2MP networks, which perform calculations on paths having equal number of hops.

At step 760, all the possible paths between an ingress point A and an egress point B in the network are identified. According to some embodiments, step 760 may be implemented by step 720 in method 700A, except that step 760 in method 700B may include the limitation that the paths joining point A to point B have a given number of hops, as determined in step 750. At step 770, the shortest path within the set of paths found in step 760 is identified. Thus, in embodiments consistent with the present disclosure, the shortest path in a graph is calculated over paths including the same number of edges. At step 780, the longest path within the set of paths found in step 760 is identified. At step 790, a minimum latency; for example, by using the shortest path found in step 770 is identified. At step 795, a maximum latency; for example, by using the longest path found in step 780 is determined.

According to some embodiments consistent with the present disclosure, steps described in methods 600, 700A, and 700B may be performed by a computer in a Network Management System (NMS) having access to resident delays and peer delays for each node in a network. For example, in some embodiments a Data Center Network Management (DCNM) system may collect resident delays and peer delays for each node in a network in order to perform at least one of the steps in methods 600, 700A, and 700B, as disclosed herein. According to some embodiments, steps included in methods 600, 700A, and 700B may be performed by controllers and processors included in at least one of the nodes in a network. For example, steps in methods 600, 700A and 700B may be performed by controllers such as controller 205 (cf. FIG. 2) in a level 2 node for an ISIS network, such as node 512 in sub-network 510 (cf. FIG. 5).

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. In a computer network having a plurality of nodes and a plurality of sub-networks, a method comprising:
   measuring a first resident delay at each of a selected set of ports at selected nodes in the network;
   measuring a first peer delay between each pair of the selected nodes that are neighbors to each other;
   determining a first latency between each of the pairs of the selected nodes that are neighbor to each other;
   measuring a second resident delay for each sub-network;
   measuring a second peer delay between each pair of sub-networks; and
   determining a second latency between each pair of neighbor sub-networks; and
   weighting a route that a data packet goes through using the first and second latencies.

2. The method of claim 1, wherein the network is an Intermediate-System to Intermediate-System (ISIS) network.

3. The method of claim 1, wherein measuring the first resident delay includes measuring a packet delay from an ingress port to an egress port in a first node in the plurality of nodes.

4. The method of claim 1, wherein measuring the first resident delay includes measuring a packet delay from every ingress port in a first node in the plurality of nodes to an egress port of the first node; and
   finding an average of the packet delays.

5. The method of claim 4, wherein finding the average is performed by a processor circuit in the first node.

6. The method of claim 1, wherein the method further comprises:
   storing the resident delays, the peer delays, and the latencies in a memory circuit.

7. The method of claim 6 wherein the method further comprises storing statistical data of the resident delays, the peer delays, and the latencies in the memory circuit.

8. The method of claim 3, wherein measuring the packet delay from the ingress port to the egress port in the first node comprises injecting a probe packet at the ingress port for forwarding to the egress port.

9. The method of claim 8, wherein measuring the packet delay from the ingress port to the egress port in the first node further comprises:
   recording a first time stamp when the probe packet is injected at the ingress port;
   recording a second time stamp when the probe packet is received at the egress port; and
   comparing the second time stamp and the first time stamp.

10. The method of claim 8, wherein the probe packet is not forwarded beyond the egress port.

11. The method of claim 1, wherein measuring the first peer delay between a first pair of the selected nodes comprises:
    forwarding a probe packet from an egress port in a first node in the first pair of selected nodes to an ingress port in a second node in the first pair of selected nodes;

recording a first time stamp when the probe packet is forwarded from the egress port;
recording a second time stamp when the probe packet is received at the ingress port; and
comparing the second time stamp and the first time stamp.

12. The method of claim 2, wherein each of the selected nodes is a level-1 node, a level-2 node, or a hybrid node.

13. The method of claim 1, wherein weighting the route comprises using Dijkstra's algorithm.

14. A network management system (NMS) comprising:
a controller comprising a memory and a processor, the controller being coupled to a network comprising a plurality of sub-networks;
wherein the controller is configured to:
measure a first resident delay for each of the sub-networks;
measure a first peer delay between each pair of the sub-networks; and
determine a first latency between each pair of sub-networks that neighbor each other;
wherein to measure the first resident delay for a first one of the sub-networks, the controller is further configured to:
access a second resident delay for each of a selected set of nodes in the first sub-network;
access a second peer delay for each pair of the selected nodes that neighbor each other in the first sub-network; and
determine a second latency between each pair of the selected nodes that neighbor each other in the first sub-networks.

15. The NMS of claim 14, wherein the controller is further configured to determine the second latency based on the second resident delay and the second peer delay of the selected nodes.

16. The NMS of claim 14, wherein the first resident delay for the first one of the sub-networks is determined based on the second latency.

17. The NMS of claim 14, wherein the controller is further configured to weight a route that a data packet goes through using the first latency.

18. The NMS of claim 17, wherein the controller is further configured to weight a route using Dijkstra's algorithm.

19. The NMS of claim 14, wherein the network is an Intermediate-System to Intermediate-System (ISIS) network.

20. The NMS of claim 19, wherein each of the selected set of nodes is a level-1 node, a level-2 node, or a hybrid node.

* * * * *